United States Patent [19]

Candy, Sr.

[11] 4,208,839

[45] Jun. 24, 1980

[54] LID OPENER FOR STORAGE CONTAINER

[76] Inventor: James O. Candy, Sr., Jones Hastings Rd., Parsonsburg, Md. 21849

[21] Appl. No.: 923,491

[22] Filed: Jul. 11, 1978

Related U.S. Application Data

[63] Continuation-in-part of Ser. No. 781,435, Mar. 25, 1977, abandoned.

[51] Int. Cl.² .............................................. E05F 11/08
[52] U.S. Cl. ........................................ 49/344; 49/357
[58] Field of Search ................. 49/330, 356, 357, 334, 49/344, 395; 52/192

[56] References Cited

U.S. PATENT DOCUMENTS

| | | | |
|---|---|---|---|
| 1,746,556 | 2/1930 | Preston | 49/356 X |
| 3,733,750 | 5/1973 | Hege | 52/192 X |
| 3,961,660 | 6/1976 | Vinci | 49/356 X |

Primary Examiner—Kenneth Downey
Attorney, Agent, or Firm—Bacon & Thomas

[57] ABSTRACT

An improved opener for the lid or hatch cover of a tall storage container. The opener includes a pivotal handle that is disposed at a location remote from the lid and is operatively connected thereto by a linkage system associated with the container. The handle is operative between a first position, in which the lid is locked in a closed position, and a second position, in which the lid is locked in an open position.

8 Claims, 6 Drawing Figures

LID OPENER FOR STORAGE CONTAINER

CROSS-REFERENCE TO RELATED APPLICATION

This application is a continuation-in-part of Application Ser. No. 781,435, filed on March 25, 1977, and now abondoned.

BACKGROUND OF THE INVENTION

1. Field of the Invention

This invention generally relates to the field of art pertaining to closure mechanisms for containers. More specifically, the invention pertains to those types of closure devices for use in conjunction with large or tall storage containers requiring mechanisms for facilitating the opening and closing of lid covers that are disposed at a considerable height from ground level.

2. Description of the Prior Art

Large storage containers are usually supported with their lids disposed at considerable heights from ground level in order to accommodate the types of delivery systems servicing such containers. Accordingly, it is desirable to be able to open and close the lids of such containers from ground level and, moreover, to maintain the lids in locked open and locked closed positions, notwithstanding the presence of wind and other adverse weather conditions.

SUMMARY OF THE INVENTION

It is therefore an object of the invention to provide an improved lid opener which permits the opening and closing of lids associated with large or tall storage containers.

It is another object of the invention to provide an improved lid opener which permits the opening and closing of container lids from a location remote from the lid.

It is a further object of the invention to provide an improved lid opener which positively locks the lid in both open and closed positions.

It is yet a further object of the invention to provide an improved lid opener which is extremely simple in construction, reliable in operation and economical to produce.

The foregoing and other objects of the invention are achieved by providing a container lid opener which includes a pivotal handle that may be mounted on the framework supporting the container. The handle is operatively connected to the lid through a linkage system including three linkage rods that are pivotally connected to each other and also pivotally connected to two support brackets, the latter being pivotally supported by the storage container. In a first position, the handle is disposed beyond top dead center, thereby maintaining the lid in a locked closed position. In a second position, the handle is disposed beyond lower dead center, thereby maintaining the lid in a locked open position.

BRIEF DESCRIPTION OF THE DRAWINGS

FIG. 5 is an enlarged fragmentary horizontal sectional view taken along the line 5—5 of FIG. 1; and FIG. 6 is an enlarged fragmentary elevational view taken along the line 6—6 of FIG. 1.

DETAILED DESCRIPTION OF THE PREFERRED EMBODIMENT

Figure 1:
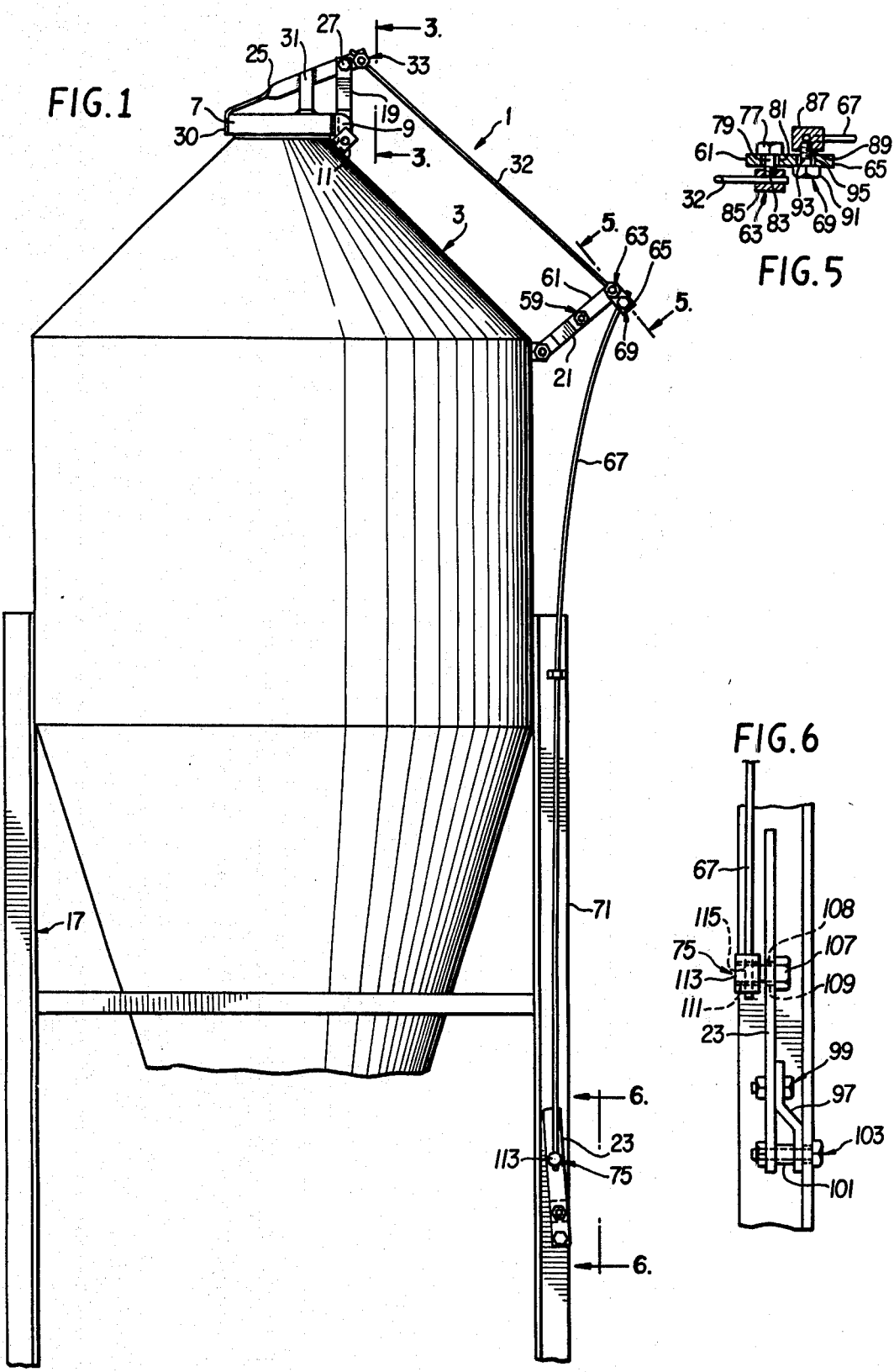
FIG. 1 is a fragmentary side elevational view of the opener of the invention in association with a tall storage container, wherein the container lid is depicted in a locked closed position.
Figure 2:
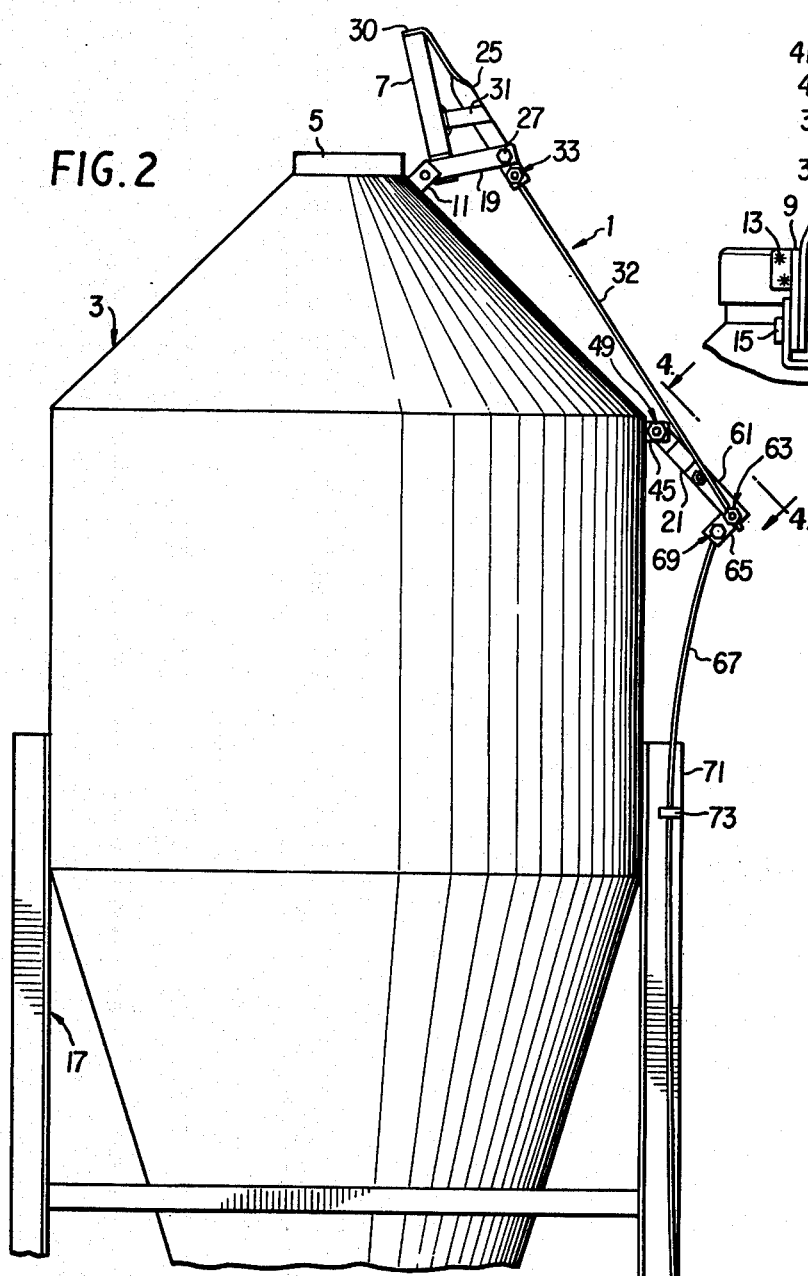
FIG. 2 is similar to FIG. 1 with the exception that the container lid is depicted in a partially open position.
Figure 3:
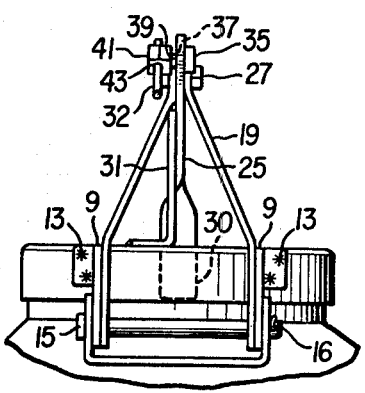
FIG. 3 is an enlarged fragmentary vertical sectional view taken along the line 3—3 of FIG. 1.

An improved lid opener 1, according to the invention, is depicted in FIGS. 1 and 2 mounted on a large container 3 having a top fill opening 5. A lid or hatch cover 7 is hingedly secured to container 3 through a pair of side brackets 9 and a U-shaped support 11. As shown in FIG. 3, brackets 9 have one pair of adjacent ends secured to lid 7 by spot welding or similar fastening means, as generally indicated at 13. The other pair of adjacent ends of brackets 9 are hingedly connected to support 11 by means of a bolt 15 held in place by a cotter pin 16 or the like. Support 11 is in turn rigidly fastened to container 3, such as by welding, bolting or other well known similar fastening means.

Because container 3 is of a large size, it is supported off ground level by a framework 17. Since lid 7 is disposed at a considerable distance above ground level, it is normally extremely difficult to open and close lid 7 for the purpose of placing material to be stored in container 3 through fill opening 5. This problem has been overcome by opener 1 which includes a first support bracket 19, a second support bracket 21 and an operating handle 23, the latter being disposed at a position lower than and remote from lid 7 to facilitate manual actuation of opener 1 from ground level.

Brackets 19 and 21 are each substantially of a Y-shaped configuration. As seen in FIG. 3, the spaced leg portions of bracket 19 are also pivotally secured to support 11 by bolt 15. The other end of bracket 19 is secured to one end of a first linkage rod 25 by means of a bolt 27. Rod 25 may be in the form of a flat strip of metal having a twist provided therein. The other end of rod 25 includes a flange 30 which overlaps and is attached to the peripheral edge of lid 7 by welding or other suitable means. An L-shaped brace 31 may be welded to both rod 25 and lid 7 for additional strengthening of the entire assembly.

A second linkage rod 32 is provided with one end pivotally attached to rod 25 adjacent bracket 19 by means of a bolt assembly 33. As more clearly seen in FIG. 3, assembly 33 includes a bolt 35 having an unthreaded portion which is journaled through an aperture 37 provided in rod 25 for free rotation with respect thereto. Bolt 35 includes a threaded free end 39 which is received within a nut 41 having an aperture 43 therethrough for receiving one end of rod 32. The longitudinal axis of rod 32 intersects the longitudinal axis of the threaded recess in nut 41. Accordingly, the end of rod 32 may be slid into position through passageway 43 to the desired position and then firmly secured in place by screwing the threaded end of bolt 35 into nut 41 to bear against rod 32.

Figure 4:
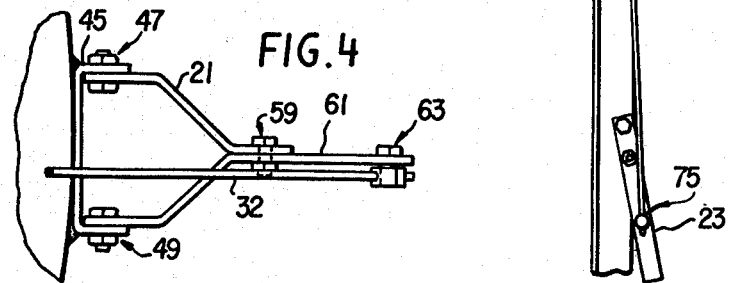
FIG. 4 is an enlarged fragmentary horizontal sectional view taken along the line 4—4 of FIG. 2.

The spaced legs of bracket 21 are pivotally attached to container 3 by means of a second U-shaped support 45 by a pair of nut and bolt assemblies 47 and 49. As more clearly seen in FIG. 4, the legs of bracket 21 may include two sections that are secured together by a nut and bolt assembly 59, with one leg including an extension 61 for pivotal connection to the other end of rod 32 through a bolt assembly 63.

Referring more particularly to FIG. 2, it is seen that extension 61 of bracket 21 includes a lateral flange portion 65 for pivotal connection to one end of a third linkage rod 67. This is achieved through a bolt assembly 69. Rod 67 may be disposed substantially along the length of a right-angle shaped beam 71 forming one leg of support 17. A guide means 73 in the form of a metal ring or the like may be attached to leg 71 for guiding the movement of rod 67 therealong. The other end of rod 67 is pivotally connected to handle 23 through a bolt assembly 75.

As shown in FIG. 5, bolt assemblies 63 and 69 are structurally the same as previously described bolt assembly 33. Assembly 63 includes a bolt 77 having an unthreaded portion 79 journaled for free rotation within an aperture 81 provided in extension 61 of bracket 21. Bolt 77 includes a threaded end 83 which is screwed into a nut 85 through which the other end of rod 32 passes. Tightening of bolt 77 into nut 85 causes threaded end 83 to bear against rod 32, thereby securing it within nut 85. A similar structure is shown for assembly 69 wherein the end of rod 67 is also secured within a nut 87 by screwing a threaded end 89 of a bolt 91 downwardly thereagainst. Bolt 91 also includes an unthreaded portion 93 journaled for free rotation through an aperture 95 provided in flange 65.

The mounting of handle 23 to leg 71 and rod 67 shall now be described with reference to FIG. 6. An end of handle 23 is provided with an offset bracket 97 which has one end secured directly against handle 23 through a nut and bolt assembly 99. The other end of bracket 97 is spaced from the corresponding end of handle 23 by a cylindrical bushing 101, with the entire assembly being pivotally attached to leg 71 through a bolt and nut assembly 103. As previously indicated, the lower end of rod 67 is pivotally connected to handle 23 intermediate the ends thereof by bolt assembly 75. As is apparent, assembly 75 is similar in structure and operation to previously described bolt assemblies 33, 63 and 69. In this regard, assembly 75 also includes a bolt 107 having an unthreaded portion 108 journaled for rotation through an aperture 109 provided in handle 23. A threaded end 111 of bolt 107 is screwed into a nut 113 which is provided with a passageway 115 therethrough for receiving the end of rod 67. Securing of rod 67 within nut 113 is achieved by tightening bolt 107 therein to bear against rod 67. As further seen in FIGS. 1 and 2, rod 67 is preferably flexible in nature and bends slightly outwardly from container 3 towards its connection to flange 65 of bracket 21.

The components making up opener 1 may be formed from any materials deemed suitable for the intended practice of the invention. For example, metal is the preferred material for the linkage rods, brackets, handle and all bolt assemblies. Nevertheless, it is to be understood that any other suitable materials, such as plastics, may also be utilized to advantage depending upon the specific application or environment of use.

MODE OF OPERATION

With opener 1 assembled as depicted in FIGS. 1 and 2, the basic manner in which opener 1 operates to open and close lid 7 of container 3 shall hereinafter be described. As seen in FIG. 1, lid 7 is in a closed position, thereby preventing loading of materials within fill opening 5 and, further, preventing contamination of the contents within container 3 by adverse weather conditions. In this closed position, it is seen that handle 23 has been pivoted upwardly about bolt assembly 103 so that handle 23 essentially rests against a section of leg 71 with the free end of handle 23 being disposed beyond top dead center with respect to rod 67. In this position, lid 7 is positively locked in a closed position since downward movement of rod 67 is rendered impossible due to the position of handle 23.

When it is desired to open lid 7, the free end of handle 23 is pulled outwardly from leg 71 so that it swings past top dead center about bolt assembly 103 into a downward position as shown in FIG. 2. Continued movement of handle 23 past this latter position will cause the free end thereof to pass lower dead center with respect to rod 67 and eventually abut against leg 71 in a similar, though opposite, manner to that depicted in FIG. 1. This position of handle 23 will place lid 7 in a securely locked full open position. Since the end of handle 23 has been rotated past lower dead center, upward movement of rod 67 is thereby rendered impossible and lid 7 is securely locked in a full open position and cannot be closed by external forces, such as high winds or other similar adverse weather conditions.

It is to be understood that the form of the invention herein shown and described is to be taken as a preferred example of the same, and that various changes in shape, size and arrangement of parts may be resorted to, without departing from the spirit of the invention or scope of the subjoined claims.

What is claimed is:

1. An improved opener for the pivotal lid of a tall storage container, which opener comprises, in combination:
   (a) a handle pivotable between a first overcenter point for locking the lid in an open position and a second overcenter point for locking the lid in a closed position;
   (b) a first pivotal bracket for attachment to the container and lid for opening and closing the lid in response to the pivotal movement of the first pivotal bracket;
   (c) a second pivotal bracket for attachment to the container;
   (d) a first link for operatively joining the first and second pivotal brackets;
   (e) a second link of elongate configuration and flexible along the length thereof for operatively joining the second pivotal bracket and the handle; and
   (f) means for guiding the movement of the second link during pivoting of the handle between the first and second overcenter points.

2. The opener of claim 1 wherein:
   (a) the first overcenter point is substantially top dead center, and
   (b) the second overcenter point is substantially bottom dead center.

3. The opener of claim 1 further including a third link for attaching the first pivotal bracket to the lid, which third link includes:
   (a) an elongate flat member having at least one twist along the longitudinal axis thereof, and
   (b) a flange for connection to the peripheral edge of the lid.

4. The opener of claim 1 wherein the first and second pivotal brackets are each of a substantially Y-shaped configuration.

5. The opener of claim 1 further including a pair of U-shaped supports for attaching the first and second pivotal brackets to the container.

6. The opener of claim 1 wherein:
(a) the first link is pivotally connected at its opposite ends to the first and second pivotal brackets, and
(b) the second link is pivotally connected at its opposite ends to the second pivotal bracket and handle.

7. The opener of claim 1 wherein the first link is of an elongate configuration.

8. The opener of claim 1 wherein the second link extends substantially upwardly and outwardly with respect to the container when the opener is in operative association with the container.

* * * * *